(12) United States Patent
Muramatsu et al.

(10) Patent No.: US 9,949,082 B2
(45) Date of Patent: Apr. 17, 2018

(54) MOBILE TERMINAL DEVICE, LOCATION SEARCH METHOD, AND COMPUTER-READABLE RECORDING MEDIUM

(71) Applicant: FUJITSU LIMITED, Kawasaki-shi, Kanagawa (JP)

(72) Inventors: Atsushi Muramatsu, Kawasaki (JP); Tomohiro Nakajima, Kawasaki (JP); Hisatoshi Yamaoka, Kawasaki (JP); Satoshi Matsuyuki, Fukuoka (JP); Kohei Kubota, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/270,213

(22) Filed: Sep. 20, 2016

(65) Prior Publication Data
US 2017/0111766 A1    Apr. 20, 2017

(30) Foreign Application Priority Data

Oct. 19, 2015    (JP) .................................. 2015-205892

(51) Int. Cl.
| | |
|---|---|
| *H04W 24/00* | (2009.01) |
| *H04W 4/02* | (2018.01) |
| *H04W 64/00* | (2009.01) |
| *H04W 4/00* | (2018.01) |
| *H04W 16/28* | (2009.01) |

(52) U.S. Cl.
CPC ........... *H04W 4/023* (2013.01); *H04W 64/00* (2013.01); *H04W 4/008* (2013.01); *H04W 16/28* (2013.01); *H04W 64/006* (2013.01)

(58) Field of Classification Search
CPC .............................. H04W 4/023; H04W 64/00
USPC ...................................... 455/457, 456.1, 90.1
See application file for complete search history.

(56) References Cited

U.S. PATENT DOCUMENTS

| | | | |
|---|---|---|---|
| 2008/0174492 A1* | 7/2008 | Kurokawa | ............ G01S 5/0215 342/451 |
| 2015/0192656 A1* | 7/2015 | Werner | ................. G01S 5/0247 342/352 |

FOREIGN PATENT DOCUMENTS

| | | |
|---|---|---|
| JP | 2004-334439 | 11/2004 |
| JP | 2005-056177 | 3/2005 |
| JP | 2005-207837 | 8/2005 |
| JP | 2007-256180 | 10/2007 |
| JP | 2008-046116 | 2/2008 |
| JP | 2014-099857 | 5/2014 |

\* cited by examiner

*Primary Examiner* — Chuck Huynh
(74) *Attorney, Agent, or Firm* — Fujitsu Patent Center

(57) ABSTRACT

A mobile terminal device includes: a receiving antenna that repeatedly receives a radio signal including predetermined identification information; a sensor that detects an orientation of the mobile terminal device every time the radio signal is received by the receiving antenna; and a controller that estimates an arrival direction of the radio signal based on radio field intensity of the radio signal which is received by the receiving antenna for each orientation when a plurality of different orientations are detected by the sensor.

10 Claims, 9 Drawing Sheets

FIG.3

| BEACON ID | | DATA #1 | DATA #2 | DATA #3 | ... |
|---|---|---|---|---|---|
| 00:11:22:33:44:55 | RECEIVING TIME | 2015-09-04 00:11:15 | 2015-09-04 00:11:24 | 2015-09-04 00:11:33 | ... |
| | TERMINAL ORIENTATION | 354° | 5° | 10° | |
| | RADIO FIELD INTENSITY | -22 dBm | -25 dBm | -28 dBm | |
| ff:ee:cc:bb:aa:99 | RECEIVING TIME | 2015-09-04 00:11:22 | 2015-09-04 00:11:28 | 2015-09-04 00:12:01 | ... |
| | TERMINAL ORIENTATION | 2° | 8° | 13° | |
| | RADIO FIELD INTENSITY | -17 dBm | -10 dBm | -12 dBm | |
| 22:11:22:33:44:55 | RECEIVING TIME | 2015-09-04 00:11:49 | 2015-09-04 00:11:54 | | ... |
| | TERMINAL ORIENTATION | 11° | 12° | | |
| | RADIO FIELD INTENSITY | -8 dBm | -10 dBm | | |
| ... | | | | | |

FIG.5

MOBILE TERMINAL DEVICE, LOCATION SEARCH METHOD, AND COMPUTER-READABLE RECORDING MEDIUM

CROSS-REFERENCE TO RELATED APPLICATION

This application is based upon and claims the benefit of priority of the prior Japanese Patent Application No. 2015-205892, filed on Oct. 19, 2015, the entire contents of which are incorporated herein by reference.

FIELD

The embodiments discussed herein are related to a mobile terminal device, a location search method, and a computer-readable recording medium.

BACKGROUND

In the related art, a technique of estimating a distance from a mobile terminal device to an object, for example, using a radio communication technique such as Bluetooth (registered trademark) is known. Specifically, a beacon that emits radio waves is attached to an object and the radio waves emitted from the beacon are received, for example, by a mobile terminal device or the like carried by a user. The mobile terminal device estimates a distance from the mobile terminal device to the beacon on the basis of radio field intensity of the received radio waves.

Estimation of an arrival direction of a radio wave emitted from a beacon is also considered to search for a location of an object. That is, a detector including, for example, an antenna that can switch its directivity receives radio waves while switching the directivity of the antenna and estimates arrival directions of radio waves on the basis of a variation in radio field intensity. Accordingly, since a distance to and a direction of a location of a beacon are estimated, it is possible to specify the location of the object to which the beacon is attached.

Patent Document 1: Japanese Laid-open Patent Publication No. 2014-99857

Patent Document 2: Japanese Laid-open Patent Publication No. 2005-207837

Patent Document 3: Japanese Laid-open Patent Publication No. 2004-334439

However, there is a problem in that it is difficult to search for a location of an object using a mobile terminal device which is generally spread such as a smartphone. That is, when a mobile terminal device such as a smartphone is used, it is possible to relatively easily estimate a distance to a beacon, but it is difficult to estimate a direction of the beacon. This is because a mobile terminal device such as a smartphone does not generally have a function of switching directivity and has a difficulty in estimating an arrival direction of a radio wave emitted from a beacon.

Accordingly, a special detector equipped with an antenna that can switch directivity or the like is used to search for a location of an object using a radio communication technique, thereby causing a decrease in convenience or an increase in cost.

SUMMARY

According to an aspect of an embodiment, a mobile terminal device includes: a receiving antenna that repeatedly receives a radio signal including predetermined identification information; a sensor that detects an orientation of the mobile terminal device every time the radio signal is received by the receiving antenna; and a controller that estimates an arrival direction of the radio signal based on radio field intensity of the radio signal which is received by the receiving antenna for each orientation when a plurality of different orientations are detected by the sensor.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating a specific example of a beacon detection list;

FIG. 5 is a diagram illustrating a specific example of a display screen;

DESCRIPTION OF EMBODIMENTS

Preferred embodiments of the present invention will be explained with reference to accompanying drawings. The present invention is not limited to the embodiments.

[a] First Embodiment

Figure 1:
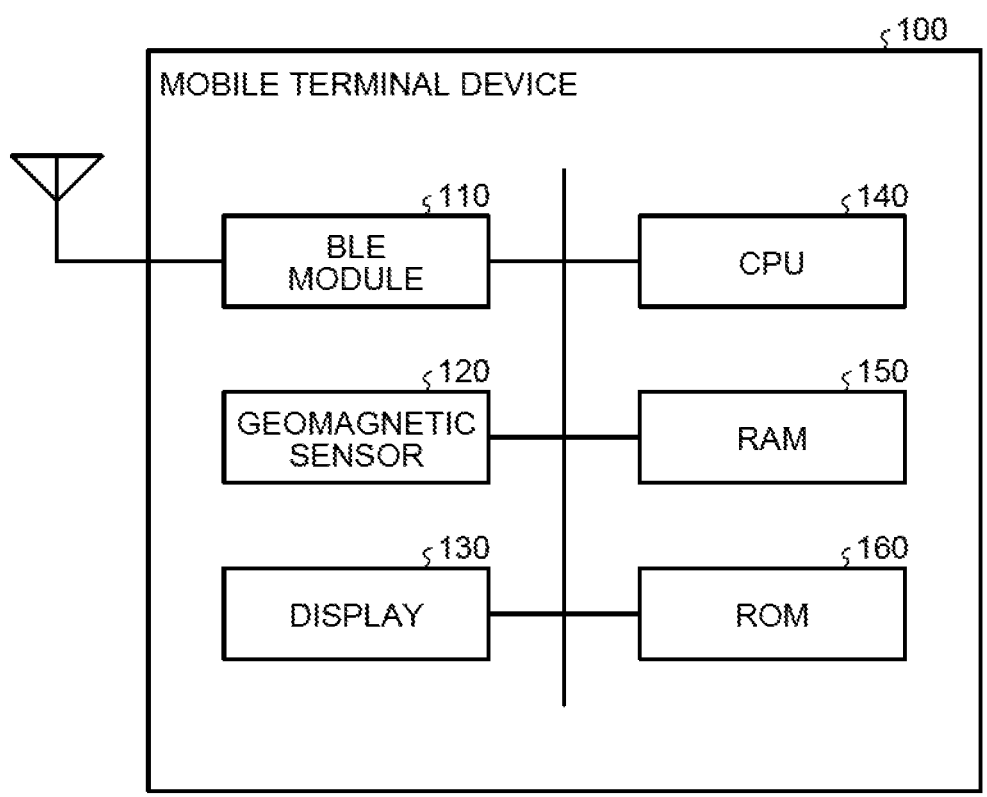
FIG. 1 is a block diagram illustrating a configuration of a mobile terminal device according to a first embodiment.

FIG. 1 is a block diagram illustrating a configuration of a mobile terminal device 100 according to a first embodiment. The mobile terminal device 100 searches for a location of an object to which a beacon transmitting Bluetooth low energy (BLE) advertisement is attached. That is, a beacon transmitting a signal based on a BLE standard is attached in advance to an object to be searched for. The beacon attached to the object repeatedly transmits a radio signal including a beacon ID which is identification information thereof with a predetermined cycle. It is assumed that a correlation between a beacon ID for identifying a beacon and a name of an object is known and the name of an object to which a beacon is attached or the like can be uniquely specified from the beacon ID.

The mobile terminal device 100 illustrated in FIG. 1 includes a BLE module 110, a geomagnetic sensor 120, a display 130, a central processing unit (CPU) 140, a random access memory (RAM) 150, and a read only memory (ROM) 160.

The BLE module 110 is a module that can receive a signal from a beacon based on the BLE standard. The BLE module 110 repeatedly receives a signal transmitted from the beacon via an antenna and outputs beacon information indicating a beacon ID included in the received signal and radio field intensity of the received signal to the CPU 140. Since the mobile terminal device 100 is generally held and used in front of a user, a signal transmitted from a beacon located in the back of the user is shielded by the user's body. Accordingly, the radio field intensity of the signal which is received from the beacon located in the back of the user by the BLE module 110 is smaller than the radio field intensity of a signal which is received from a beacon located in front of the user. That is, the BLE module 110 becomes better in sensitivity in front of a user than in the back of the user.

The geomagnetic sensor 120 is, for example, a three-axes geomagnetic sensor and serves to detect geomagnetism and to acquire a magnetic north azimuth. The geomagnetic sensor 120 outputs geomagnetic information indicating the magnetic north azimuth to the CPU 140. In this embodiment, the geomagnetic sensor 120 is used as an example of the sensor that detects the orientation of the mobile terminal device 100, but a sensor other than the geomagnetic sensor 120 may be used as long as it can detect a rotation angle in the horizontal direction of the mobile terminal device 100 in a state in which a user carries the mobile terminal device 100. Examples of the sensor that detects the orientation of the mobile terminal device 100 include a gyro sensor that detects an angular velocity of the mobile terminal device 100 and an acceleration sensor that detects acceleration.

The display 130 includes, for example, a liquid crystal panel and displays a variety of information. Specifically, the display 130 displays display information output, for example, from the CPU 140. Although not illustrated in FIG. 1, the display 130 may be disposed to overlap a touch panel that detects a user's touch or the like.

The CPU 140 performs various processes using data stored in the RAM 150 and the ROM 160 and comprehensively controls the entire mobile terminal device 100. Specifically, the CPU 140 estimates a direction of an object to which a beacon is attached and a distance to the object on the basis of beacon information output from the BLE module 110 and geomagnetic information output from the geomagnetic sensor 120. The CPU 140 causes the display 130 to display the location of the object indicated by the estimated direction and the estimated distance. The function of the CPU 140 will be described later in detail.

The RAM 150 is a memory which data can be read from and written to by the CPU 140 and temporarily stores data written by the CPU 140.

The ROM 160 is a memory from which data can be read by the CPU 140 and stores, for example, data which is written at the time of factory shipments of the mobile terminal device 100.

Figure 2:
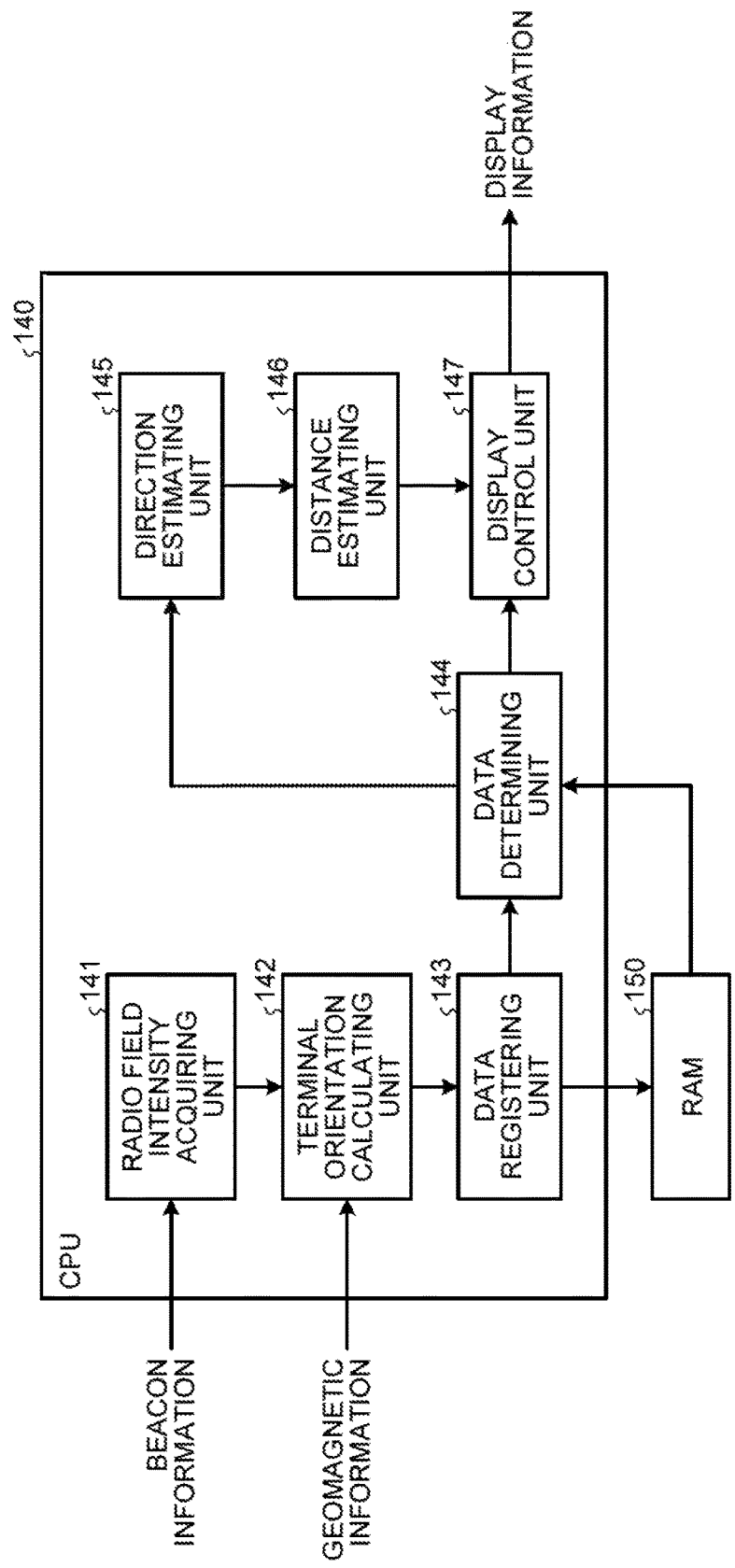
FIG. 2 is a block diagram illustrating a function of a central processing unit (CPU)

FIG. 2 is a block diagram illustrating the function of the CPU 140. The CPU 140 illustrated in FIG. 2 includes a radio field intensity acquiring unit 141, a terminal orientation calculating unit 142, a data registering unit 143, a data determining unit 144, a direction estimating unit 145, a distance estimating unit 146, and a display control unit 147. These processing units may be embodied by software or may be embodied by hardware.

The radio field intensity acquiring unit 141 acquires beacon information output from the BLE module 110 and acquires radio field intensity of a signal received by the BLE module 110 from the beacon information. The radio field intensity acquiring unit 141 outputs the acquired radio field intensity along with the beacon ID included in the beacon information to the terminal orientation calculating unit 142.

The terminal orientation calculating unit 142 calculates an orientation of the mobile terminal device 100 (hereinafter, referred to as a "terminal orientation") on the basis of the geomagnetic information output from the geomagnetic sensor 120. At this time, the terminal orientation calculating unit 142 specifies a gravitational direction, for example, using an acceleration sensor of the mobile terminal device 100 or the like and may calculate the terminal orientation from the magnetic north azimuth acquired from the geomagnetic information and the gravitational direction. The terminal orientation calculating unit 142 outputs the calculated terminal orientation along with the beacon ID and the radio field intensity input from the radio field intensity acquiring unit 141 to the data registering unit 143.

As described above, the geomagnetic sensor 120 does not need to be necessarily used as the sensor that detects the orientation of the mobile terminal device 100. When another sensor is used as the sensor that detects the orientation of the mobile terminal device 100, a relative orientation in which the first-detected orientation of the mobile terminal device 100 is set to 0° may be used as the terminal orientation.

The data registering unit 143 generates data in which the beacon ID, the radio field intensity, and the terminal orientation input from the terminal orientation calculating unit 142 are correlated with each other and registers the generated data in a beacon detection list stored in the RAM 150. That is, since the radio field intensity acquiring unit 141 and the terminal orientation calculating unit 142 acquire the radio field intensity and calculate the terminal orientation every time at which a signal transmitted from a beacon is received, the data registering unit 143 generates data corresponding to the beacon ID every time at which the signal is received.

The data registering unit 143 registers the data in correlation with the beacon IDs in the beacon detection list in which the radio field intensity and the terminal orientation are stored. Specifically, the beacon detection list is, for example, a list illustrated in FIG. 3. That is, as illustrated in FIG. 3, a receiving time, the terminal orientation, and the radio field intensity are stored in correlation with the beacon ID. The receiving time indicates date and time at which a signal transmitted from a beacon is received by the BLE module 110. The terminal orientation is a terminal orientation calculated by the terminal orientation calculating unit 142 and indicates the orientation of the mobile terminal device 100 when the signal is received by an azimuth with the magnetic north as 0°. The radio field intensity is radio field intensity acquired by the radio field intensity acquiring unit 141 and indicates the radio field intensity of the received signal. In the beacon detection list, corresponding data is registered every time at which a signal is received from a beacon.

Referring to FIG. 2 again, when the data is registered in the beacon detection list of the RAM 150 by the data registering unit 143, the data determining unit 144 determines whether sufficient data is registered in the beacon detection list for the beacon attached to the object to be searched for. Specifically, the data determining unit 144 determines whether the terminal orientations of 0° to 360° are all included with reference to all the data corresponding to the beacon ID of the beacon attached to the object to be searched for.

That is, the data determining unit 144 sorts the terminal orientations corresponding to the beacon ID as a target, for example, in an ascending order and determines whether a minimum value thereof is within a predetermined range from 0° and whether a maximum value thereof is within a predetermined range from 360°. The data determining unit 144 determines whether the intervals of the terminal orientations sorted in the ascending order are separated, for example, by 15° or more. When the minimum value and the maximum value of the terminal orientation are within a predetermined range from 0° and 360°, respectively, and the intervals of the terminal orientations are less than 15°, the data determining unit 144 determines that all the terminal orientations are included.

When all the terminal orientations are not included, the data determining unit 144 notifies the display control unit 147 of the fact. On the other hand, when all the terminal orientations are included, the data determining unit 144 notifies the direction estimating unit 145 of the fact.

When it is notified that all the terminal orientations are included in the beacon detection list from the data determining unit 144, the direction estimating unit 145 estimates a direction at which the beacon is located using the data stored in the beacon detection list. Specifically, the direction estimating unit 145 estimates the terminal orientation corresponding to the maximum radio field intensity among the terminal orientations corresponding to the beacon ID of the beacon attached to the object to be searched for to be the direction of the beacon.

As described above, since a signal transmitted from a beacon located in the back of a user is shielded by the user's body, the radio field intensity of the signal received from the beacon located in the back of the user is smaller than the radio field intensity of a signal received from a beacon located in front of the user. In other words, when the radio field intensity is large, it is possible to estimate that the beacon is located in the orientation of the mobile terminal device 100 in front of the user. Therefore, the direction estimating unit 145 estimates that the terminal orientation having the maximum radio field intensity is the direction of the beacon.

When the direction of the beacon is estimated by the direction estimating unit 145, the distance estimating unit 146 estimates a distance to the beacon on the basis of the radio field intensity used to estimate the direction. That is, the distance estimating unit 146 estimates the distance to the beacon on the basis of how the maximum value of the radio field intensity corresponding to the beacon ID of the beacon attached to the object to be searched for is attenuated from the radio field intensity at the time of transmitting a signal. Information such as the radio field intensity at the time of transmitting a signal or the degree of attenuation of the radio field intensity per unit distance may be stored in the header of the signal transmitted from the beacon or may be calculated from a previous measurement result.

When it is notified that all the terminal orientations are not included in the beacon detection list from the data determining unit 144, the display control unit 147 causes the display 130 to display the display information for instructing the user to change the orientation with the mobile terminal device 100 carried. At this time, the display control unit 147 may cause the display 130 to display the display information for instructing the user to turn at the position with the mobile terminal device 100 carried. The display control unit 147 may cause the display 130 to display the display information for instructing the user to face the terminal orientation which is not included. The display control unit 147 also causes the display 130 to display the display information for instructing the user to change the orientation with the mobile terminal device 100 carried when a process of searching for a location of an object is started.

On the other hand, when all the terminal orientations are included in the beacon detection list and the location of the beacon is estimated by the direction estimating unit 145 and the distance estimating unit 146, the display control unit 147 causes the display 130 to display the display information indicating the estimation result. Specifically, the display control unit 147 causes the display 130 to display, for example, display information including concentric circles centered on the position of the mobile terminal device 100 and a predetermined symbol indicating the location of the beacon. The display control unit 147 may cause the display 130 to display, for example, display information including a message indicating the distance to and the direction of the beacon.

Figure 4:
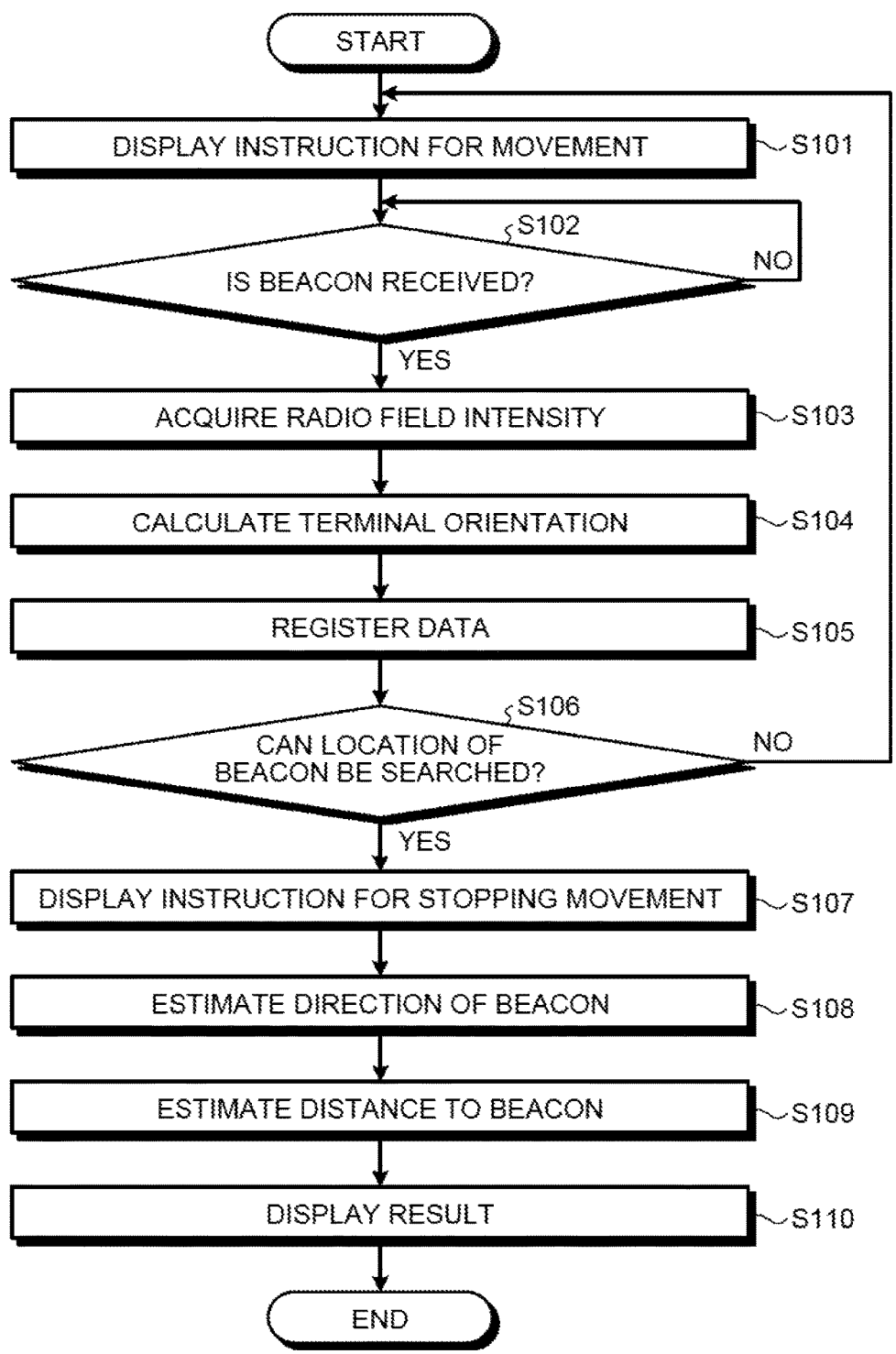
FIG. 4 is a flowchart illustrating a location search process according to the first embodiment.

Subsequently, a process of searching for a location of an object using the mobile terminal device 100 having the above-mentioned configuration will be described with reference to the flowchart illustrated in FIG. 4.

The location search process is started when a user performs a predetermined operation using a touch panel or a keyboard of the mobile terminal device 100. At this time, the user may performs an operation of starting the location search process, for example, by designating a specific object or may perform an operation of starting the location search process of an object located around without designating the object. When a specific object is designated, a correlation between an object and a beacon attached to the object is known and thus the beacon having a specific beacon ID is searched for on the basis of the correlation. An example in which a beacon having a specific beacon ID is searched for will be described below.

When a user performs an operation of starting the location search process of a beacon by designating a specific beacon ID, display information for instructing the user to move with the mobile terminal device 100 carried is displayed on the display 130 under the control of the display control unit 147 (step S101). Specifically, the display information for instructing the user to change the orientation with the mobile terminal device 100 carried is displayed on the display 130. Accordingly, for example, an instruction that instructs the user to slowly turn with the mobile terminal device 100 carried, for example, as in a display screen 210 illustrated in FIG. 5 is displayed on the display 130.

The user changes the orientation with the mobile terminal device 100 carried in response to the instruction. As a result, the mobile terminal device 100 waits for receiving a signal transmitted from the beacon having the designated beacon ID while changing the orientation thereof (step S102). At this time, the radio field intensity of the signal received by the BLE module 110 is relatively large while the location of the beacon is in front of the user. On the other hand, the radio field intensity of the signal received by the BLE module 110 is relatively small, because the signal transmitted from the beacon is shielded by the user's body while the location of the beacon is in the back of the user.

Therefore, when the signal from the beacon having the designated beacon ID is received by the BLE module 110 (Yes in step S102), beacon information including the beacon ID and the radio field intensity of the received signal is output to the radio field intensity acquiring unit 141 of the CPU 140. Then, the beacon ID and the radio field intensity are acquired from the beacon information by the radio field intensity acquiring unit 141 (step S103). The beacon ID and the radio field intensity are output to the terminal orientation calculating unit 142.

When the beacon ID and the radio field intensity are input to the terminal orientation calculating unit 142, the terminal orientation calculating unit 142 acquires geomagnetic information indicating the magnetic north azimuth from the geomagnetic sensor 120. Then, the terminal orientation calculating unit 142 calculates the orientation of the mobile terminal device 100 (the terminal orientation) at the time of receiving a signal from the beacon from the geomagnetic information and sensor values of an acceleration sensor or the like (not illustrated) (step S104).

The calculated terminal orientation along with the beacon ID and the radio field intensity is output to the data registering unit 143 and the data registering unit 143 generates data in which the radio field intensity and the terminal orientation are correlated with the beacon ID. Then, the data registering unit 143 registers the generated data in the beacon detection list stored in the RAM 150 (step S105). At this time, the receiving time at which the signal is received is also registered in the beacon detection list.

When the data is registered in the beacon detection list by the data registering unit 143, the data determining unit 144 determines whether data sufficient for searching for the location of the beacon having the designated beacon ID is registered in the beacon detection list (step S106). That is, it is determined whether the radio field intensity of all the orientations is registered in the beacon detection list. Specifically, the data determining unit 144 reads all the terminal orientations of the data corresponding to the designated beacon ID from the beacon detection list and sorts the read terminal orientations in the ascending order. Then, it is determined whether the minimum value of the terminal orientation is within a predetermined range from 0° and whether the maximum value of the terminal orientation is within a predetermined range from 360°. It is determined whether the intervals of the terminal orientations sorted in the ascending order are separated, for example, by 15° or more.

As a result of the determinations, when it is determined that the minimum value and the maximum value of the terminal orientations are within a predetermined range from 0° and 360°, respectively, and all the intervals of the terminal orientations are less than 15°, the data determining unit 144 determines that all the terminal orientations are included. On the other hand, when the minimum value or the maximum value of the terminal orientations is within a predetermined range from 0° or 360° or any one of the intervals of the terminal orientations is separated by 15° or more, the data determining unit 144 determines that all the terminal orientations are not included.

When all the terminal orientations are not included, it is difficult to search for the location of the beacon (No in step S106) and thus the instruction displayed on the display screen 210 illustrated in FIG. 5 is displayed on the display 130 under the control of the display control unit 147. Accordingly, by causing the user to change the orientation with the mobile terminal device 100 carried and receiving a signal from the beacon in a new terminal orientation, new data is registered in the beacon detection list.

When all the terminal orientations are included in the beacon detection list and the location of the beacon can be searched for (Yes in step S106), display information for instructing the user to stop the movement is displayed on the display 130 under the control of the display control unit 147 (step S107). Specifically, on the display 130, for example, the display screen 210 illustrated in FIG. 5 disappears and a message indicating that the search for the beacon is completed is displayed instead as in a display screen 220.

The direction estimating unit 145 estimates the direction in which the beacon is located with reference to the beacon detection list along with the display (step S108). That is, the direction estimating unit 145 selects the maximum radio field intensity with reference to all the radio field intensity corresponding to the beacon ID designated by the user. Then, the terminal orientation corresponding to the maximum radio field intensity is estimated to be the direction of the beacon. When the beacon is located in front of the user as described above, the signal transmitted from the beacon is not shielded by the user's body and thus the radio field intensity of the signal received by the BLE module 110 is relatively large. Accordingly, it is possible to estimate that the beacon is located in the terminal orientation having the maximum radio field intensity.

After the direction of the beacon is estimated, the distance estimating unit 146 estimates the distance from the mobile terminal device 100 to the beacon on the basis of the maximum radio field intensity used to estimate the direction of the beacon (step S109). That is, the distance estimating unit 146 estimates the distance to the beacon on the basis of how the maximum radio field intensity is attenuated from the radio field intensity at the time of transmitting a signal. At this time, the distance estimating unit 146 uses the information such as the radio field intensity at the time of transmitting a signal and the degree of attenuation of the radio field intensity per unit distance. Such information may be stored in the header of the signal transmitted from the beacon or may be calculated from the measurement result in advance.

The direction of the beacon estimated by the direction estimating unit 145 and the distance to the beacon estimated by the distance estimating unit 146 are notified to the display control unit 147. Then, the display control unit 147 generates a result display screen indicating the location of the beacon and causes the display 130 to display the generated result display screen (step S110).

Figure 6:
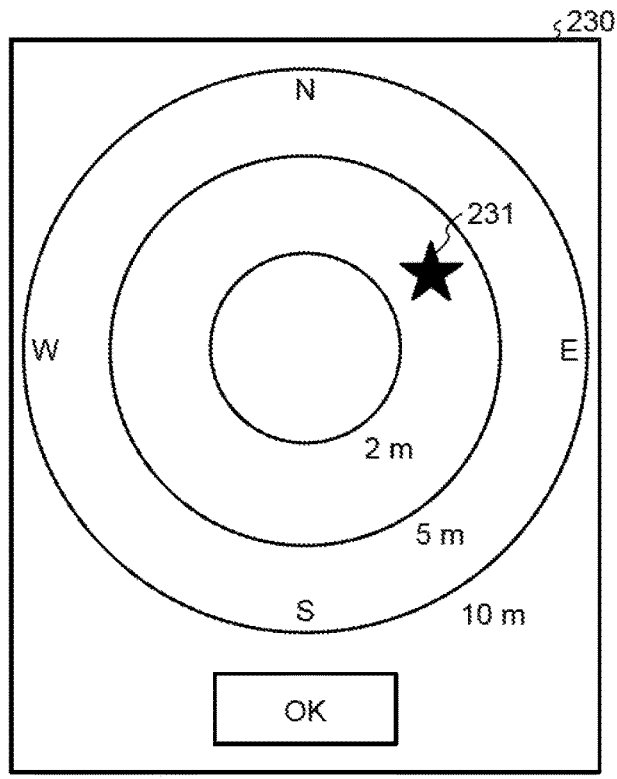
FIG. 6 is a diagram illustrating a specific example of a result display screen.

On the result display screen, a predetermined symbol 231 indicating the location of the beacon may be displayed in concentric circles centered on the location of the mobile terminal device 100 as in a display screen 230 illustrated in FIG. 6. On the display screen 230, the distance from the mobile terminal device 100 is displayed by the concentric circles and orientations of north, south, east, and west are displayed. In the display screen 230, the symbol 231 indicating the location of the beacon may have a shape or a color corresponding to the beacon ID. That is, locations of beacons having different beacon IDs may be displayed by different symbols. In the display screen 230, absolute orientations may be displayed such that the magnetic north is located on the upper side of the display screen 230, or relative orientations may be displayed such that the current orientation of the mobile terminal device 100 faces the upper side of the display screen 230.

On the result display screen, the location of the beacon may be displayed in the form of a text as in a display screen 240 illustrated in FIG. 6. In the display screen 240, the location of the object corresponding to the beacon ID designated by the user is separated with which distance in which orientation from the current position of the mobile terminal device 100. That is, in the display screen 240, the case in which the object corresponding to the beacon ID designated by the user is a "folding umbrella" is exemplified.

As described above, according to this embodiment, the mobile terminal device receives a signal transmitted from a beacon attached to an object in a plurality of different terminal orientations and stores the radio field intensity of the received signal in each terminal orientation. Then, the mobile terminal device estimates that the terminal orientation having the maximum radio field intensity is the direction of the beacon and estimates the distance to the beacon on the basis of the radio field intensity. Accordingly, on the basis of the fact that a signal transmitted from a beacon is shielded by a user's body carrying the mobile terminal device, it is possible to specify a location of the beacon using a non-directional antenna. As a result, it is possible to simply search for a location of an object with a low cost.

[b] Second Embodiment

A second embodiment is characterized in that a range in which the radio field intensity is relatively large is specified in estimating a direction of a beacon and the beacon is estimated to be located in a central direction of the specified range.

The configuration of a mobile terminal device according to the second embodiment is the same as the configuration of the mobile terminal device 100 (FIGS. 1 and 2) according to the first embodiment and thus description thereof will not be repeated. The second embodiment is different from the first embodiment in the beacon direction estimating process using the direction estimating unit 145.

Figure 7:
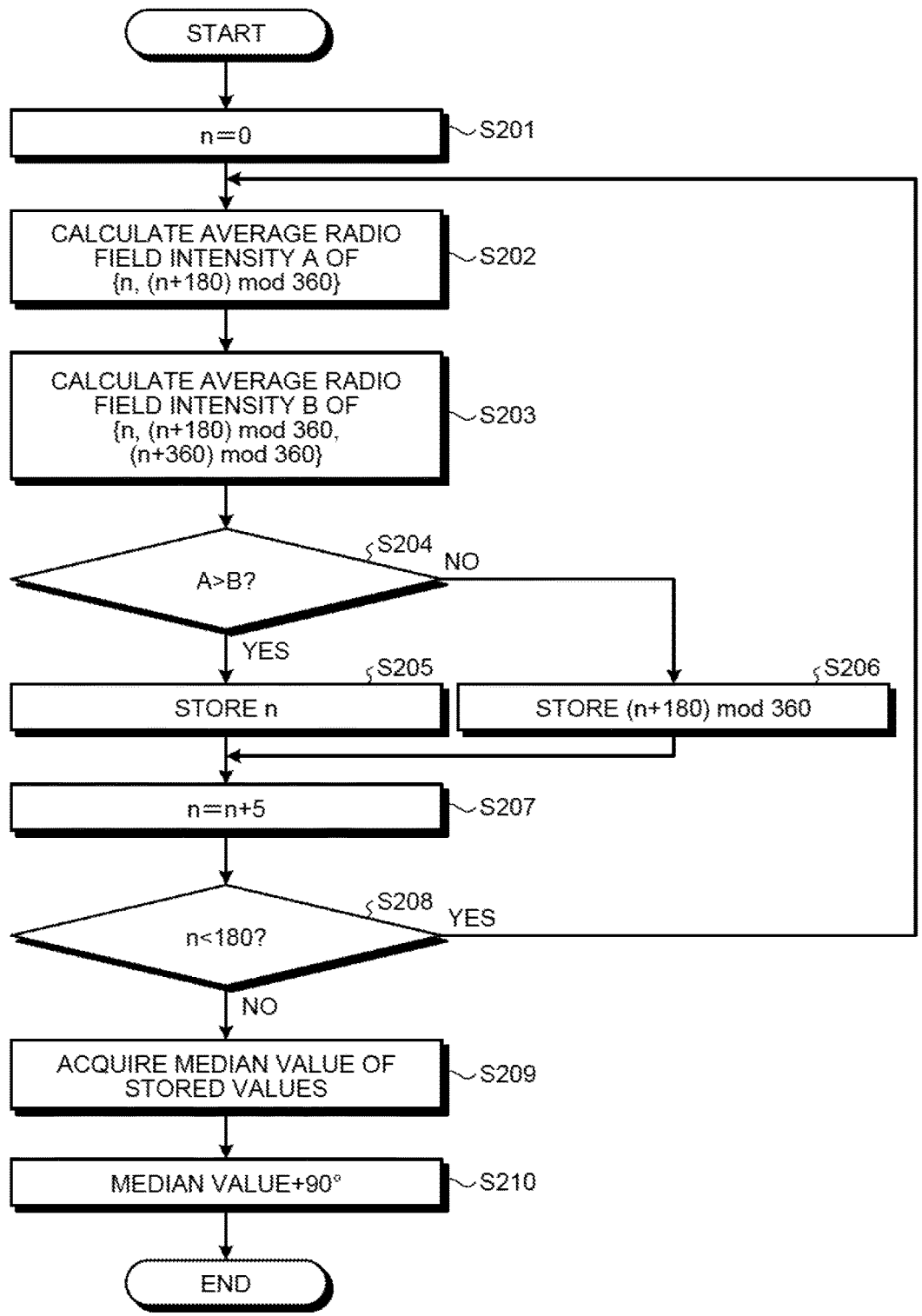
FIG. 7 is a flowchart illustrating an orientation estimating process according to a second embodiment.

The direction estimating process according to the second embodiment will be described below with reference to the flowchart illustrated in FIG. 7. FIG. 7 is a flowchart illustrating the direction estimating process according to the second embodiment and illustrates a process which is mainly performed by the direction estimating unit 145.

When the data determining unit 144 determines that all the terminal orientations are included in the beacon detection list, the direction estimating unit 145 sets a variable n to 0 (step S201). The variable n indicates an orientation of a start point of a predetermined range for estimating a direction of a beacon.

Then, the direction estimating unit 145 reads the radio field intensity corresponding to the terminal orientation included in a range within 180° from n° as the starting point from the beacon detection list and calculates an average value A of the read radio field intensity (step S202). Similarly, the direction estimating unit 145 reads the radio field intensity corresponding to the terminal orientation included in a range within 180° from (n+180)° as the starting point from the beacon detection list and calculates an average value B of the read radio field intensity (step S203). Accordingly, all the orientations are divided into two ranges with an angle width of 180°, and the average value A of the read radio field intensity in the terminal orientation included in the range of 0° to 180° and the average value B of the radio field intensity in the terminal orientation included in the range of 180° to 0° (360°) are calculated.

In FIG. 7, in order to express all the orientations by angles less than 360°, a remainder obtained when each of the angle is divided by 360 is used as an orientation. That is, the mod operator in FIG. 7 is a remainder operator and "X mod Y" indicates a remainder when X is divided by Y.

When the average value A and the average value B are calculated, the average values are compared with each other (step S204). When the average value A is larger (Yes in step S204), the value of n (herein, 0) which is a start pint of the range corresponding to the average value A is stored (step S205). On the other hand, when the average value B is larger (No in step S204), the value of (n+180) (herein, 180) which is a start point of the range corresponding to the average value B is stored (step S206). That is, the orientation of the start point of the range in which the average value of the radio field intensity is the maximum among plural different ranges having different start points is stored.

When the value of n or (n+180) is stored in this way, the variable n increases by a predetermined step width. Here, for example, the variable n increases by 5 (step S207) and it is then determined whether the increasing variable n is less than 180 (step S208).

When the variable n is less than 180 (Yes in step S208), the above-mentioned process is repeatedly performed and the value of n or (n+180) is stored again. That is, the orientation of the start point of the range in which the average value of the radio field intensity is the maximum among the two ranges with an angle width of 180° is stored while the direction of the range with the angle width of 180° is changed by 5° every time. By storing the orientation of the start point of the range in which the average value of the radio field intensity is the maximum in this way, the range of the terminal orientation in which the average value of the radio field intensity is large and the beacon is considered to be located in front of the user is accumulated. By comparing the average values of the radio field intensity in the ranges with an angle width, it is possible to exclude an influence of a local decrease in radio field intensity due to an obstacle located around the beacon.

Then, when the variable n is equal to or greater than 180 (No in step S208), the direction estimating unit 145 acquires the median value of all the stored values (step S209). The median value to be acquired indicates the start point of the range in which the average value of the radio field intensity is the maximum. Therefore, in order to acquire the center orientation of the range, 90° which is half the angle width of the range is added to the acquired median value (step S210) and the orientation of the acquired addition result is estimated to be the direction of the beacon.

Figure 8:
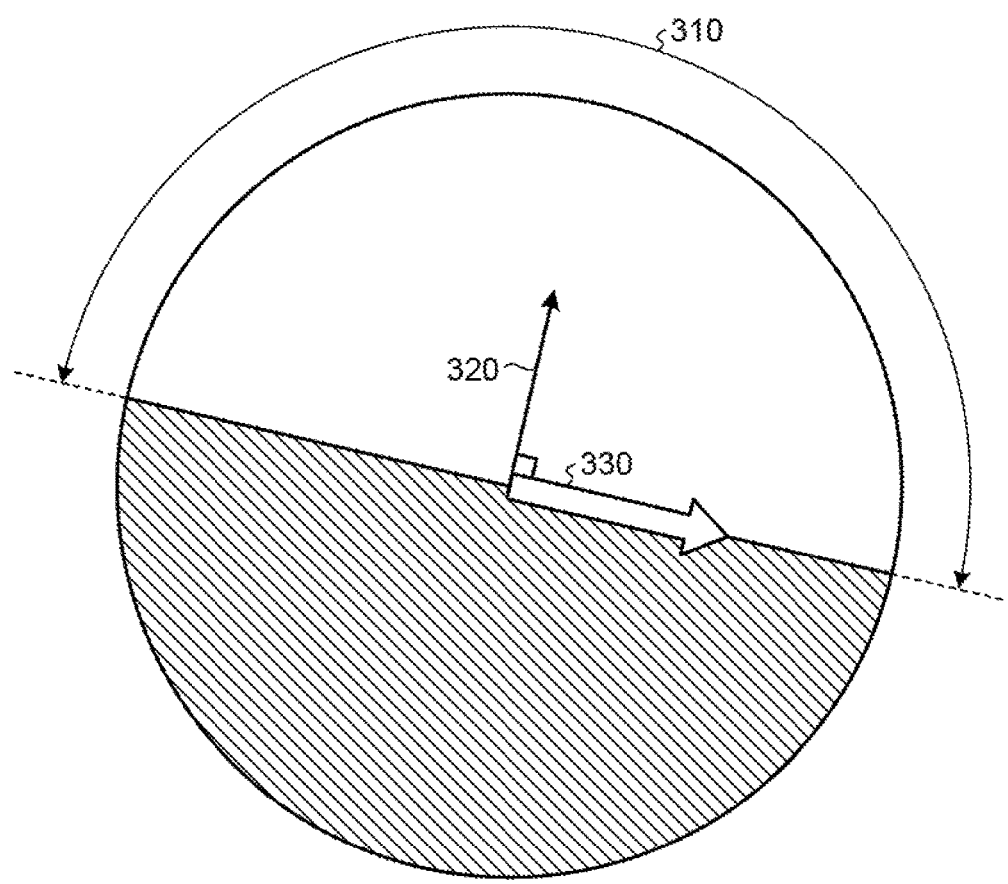
FIG. 8 is a diagram for describing a specific example of orientation estimation according to the second embodiment.

Specifically, for example, as illustrated in FIG. 8, the range of the stored values reaches a range 310, a median value 320 of the range 310 indicates the start point of the range in which the average radio field intensity is the maximum. Accordingly, an orientation 330 acquired by adding 90° to the median value 320 is estimated to be the direction of the beacon. Here, the entire orientation is divided into two ranges with an angle width of 180°, but the same process can be performed even when the entire orientation may be divided into three ranges with an angle width of 120°. When the angle width of one range is set to 120°, the value corresponding to the start point of the range in which the average value of the radio field intensity is the maximum among n, (n+120), and (n+240) indicating the orientation of the start point of each range is accumulated while increasing the variable n. The orientation which is acquired by adding 60° which is half the angle width of each range to the median value of the values accumulated while the variable n is less than 120 is estimated to be the direction of the beacon. Even when the angle width of one range is different, it is possible to estimate the direction of the beacon in the same way. By decreasing the angle width of the range, it is possible to reduce the number of times of increasing the variable n and to reduce the number of times of repeatedly performing the process.

Figure 9:
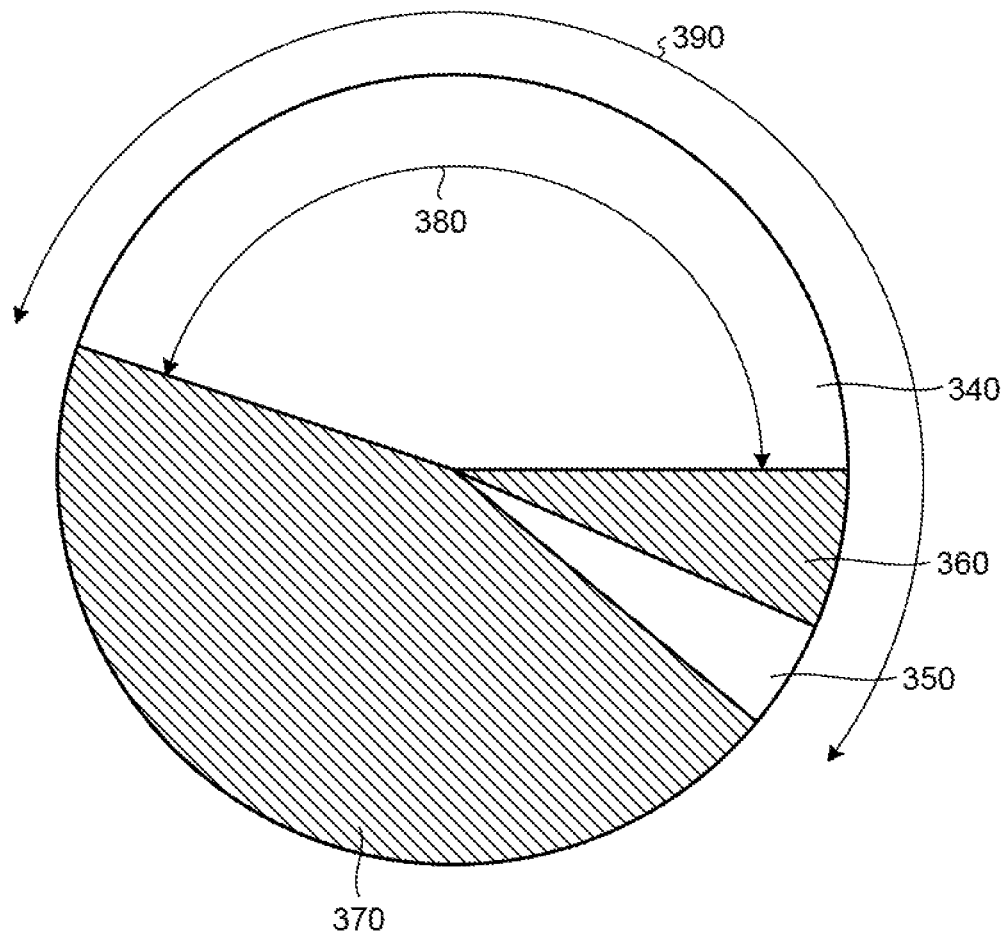
FIG. 9 is a diagram illustrating the orientation estimation according to the second embodiment.

When the median value of the stored values is acquired, it can be considered that all the stored values are not continuous. That is, for example, as illustrated in FIG. 9, the range of the stored values may be divided into a range 340 and a range 350. In other words, in FIG. 9, the range 340 and the range 350 correspond to the start points of the ranges in which the average value of the radio field intensity increases, but a range 360 and a range 370 correspond to the start points of the ranges in which the average value of the radio field intensity decreases.

In this case, the range 340 in which the angle width is the maximum may be selected among the ranges in which the average value of the radio field intensity is large, the median value of the angle width 380 of the selected range 340 may be acquired, and the direction of the beacon may be estimated. That is, the orientation acquired by adding 90° to the median value of the angle width 380 may be estimated to be the direction of the beacon. A part excluding the range 370 in which the angle width is the maximum may be selected among the ranges in which the average value of the radio field intensity is small, the median value of the angle width 390 of the selected part may be acquired, and the direction of the beacon may be estimated. That is, the orientation of the addition result which is acquired by adding 90° to the median value of the angle width 390 may be estimated to be the direction of the beacon.

As described above, according to this embodiment, the entire orientation is divided into plural ranges with the same angle width, the range in which the average value of the radio field intensity is the maximum is accumulated while changing the orientation of each range, and the center direction of a set of the ranges in which the average value of the radio field intensity is the maximum is estimated to be the direction of the beacon. Accordingly, it is possible to exclude an influence of a local decrease in radio field intensity of a received signal due to, for example, an obstacle located around a beacon and to accurately estimate a direction of the beacon.

In the above-mentioned embodiments, a position of a beacon designated by a user is searched for, but positions of plural beacons may be simultaneously searched for. For example, when plural objects are grouped and an object of any one group is designated by a user, positions of all objects belonging to the same group as the object may be searched for. In this case, beacon IDs of beacons attached to the objects can be grouped in the same ways as grouping the objects and information of the beacon IDs belonging to the same group and correlated with each other can be stored in, for example, the RAM 150 or the like. Data associated with the beacon IDs belonging to the same group are registered in the beacon detection list.

Since an antenna of the mobile terminal device 100 may have minute directivity, the directivity may be measured in advance and an influence of the directivity may be corrected at the time of estimating a direction of a beacon. Specifically, the direction of the beacon may be estimated using a signal transmitted from a beacon of which the location is known and an error included in the estimation result may be used as a correction coefficient. For example, it is assumed that a direction of a beacon is estimated using a signal transmitted from the beacon located in the orientation of 0° and the direction of the beacon is an orientation of 5° as the estimation result. In this case, the direction of the beacon estimated in the embodiments may be corrected by setting the correction coefficient of the estimation result to −5°. In the second embodiment, the radio field intensity of data stored in the beacon detection list may be first corrected and then the average radio field intensity in each range may be calculated.

The location search process and the direction estimating process described in the above-mentioned embodiments may be described as a program which can be executed by a computer. In this case, the program may be stored in a computer-readable recording medium and may be introduced into a computer. Examples of the computer-readable recording medium include a portable recording medium such as a CD-ROM, a DVD disk, or a USB memory and a semiconductor memory such as a flash memory.

According to the mobile terminal device, the location search method, and the computer-readable recording medium according to the aspect disclosed in the present specification, it is possible to simply search for a location of an object at a low cost.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A mobile terminal device comprising:
a receiving antenna that receives a radio signal a plurality number of times while an orientation of the mobile terminal device changes, the radio signal including predetermined identification information and transmitted repeatedly by a transmission source of the radio signal;
a sensor that detects a plurality of different orientations of the mobile terminal device at each of which the radio signal is received by the receiving antenna; and
a controller that estimates a direction at which the transmission source is located based on radio field intensity of the radio signal which is received by the receiving antenna for each of the plurality of different orientations detected by the sensor.

2. The mobile terminal device according to claim 1, wherein the controller estimates an orientation in which the radio field intensity of the radio signal is a maximum among the plurality of different orientations detected by the sensor as the direction at which the transmission source is located.

3. The mobile terminal device according to claim 1, wherein the controller divides the plurality of different orientations detected by the sensor into ranges with a predetermined angle width, calculates an average value of the radio field intensity of the radio signal in each range, and estimates an orientation corresponding to a range in which the average value of the radio field intensity is a maximum as the direction at which the transmission source is located.

4. The mobile terminal device according to claim 1, wherein the controller estimates the direction at which the transmission source is located when a plurality of orientations adjacent to each other within a predetermined interval over one round are detected by the sensor.

5. The mobile terminal device according to claim 1, wherein the controller estimates a distance between the mobile terminal device and the transmission source based on the radio field intensity of the radio signal in the direction at which the transmission source is located and outputs a positional relationship between the mobile terminal device and the transmission source.

6. The mobile terminal device according to claim 5, wherein the controller causes a display to display the positional relationship indicating a location of the transmission source using a symbol corresponding to the identification information included in the radio signal.

7. The mobile terminal device according to claim 1, further comprising a storage that stores the identification information included in the radio signal and another identification information corresponding to the identification information in correlation with each other,
  wherein the controller estimates the direction at which the transmission source is located and estimates an arrival direction of another radio signal including the another identification information stored in the storage based on an orientation detected by the sensor and radio field intensity of the another radio signal when the another radio signal is received by the receiving antenna.

8. A location search method in a mobile terminal device, the location search method comprising:
  receiving a radio signal a plurality number of times while an orientation of the mobile terminal device changes, the radio signal including predetermined identification information and transmitted repeatedly by a transmission source of the radio signal;
  detecting a plurality of different orientations of the mobile terminal device at each of which the radio signal is received; and
  estimating, using a processor, a direction at which the transmission source is located based on radio field intensity of the radio signal which is received for each of the plurality of different orientations detected for the mobile terminal device.

9. A non-transitory computer-readable recording medium having stored therein a program that causes a computer to execute a process comprising:
  receiving a radio signal a plurality number of times while an orientation of the computer changes, the radio signal including predetermined identification information and transmitted repeatedly by a transmission source of the radio signal;
  detecting a plurality of different orientations of the computer at each of which the radio signal is received; and
  estimating a direction at which the transmission source is located based on radio field intensity of the radio signal which is received for each of the plurality of different orientations detected for the computer.

10. The mobile terminal device according to claim 1, further comprising a display that displays an instruction for a user carrying the mobile terminal device to change an orientation with the mobile terminal device carried, wherein
  the sensor detects the plurality of different orientations of the mobile terminal device after the display displays the instruction.

* * * * *